United States Patent
Lee et al.

(10) Patent No.: US 12,153,952 B1
(45) Date of Patent: Nov. 26, 2024

(54) METHOD FOR PROCESSING MULTIPLE TRANSACTIONS CONVERTED FROM SINGLE TRANSACTION IN PROCESSOR, AND PROCESSOR FOR PERFORMING SAME

(71) Applicant: MetisX CO., Ltd., Yongin-si (KR)

(72) Inventors: Kwang Sun Lee, Yongin-si (KR); Do Hun Kim, Yongin-si (KR); Kee Bum Shin, Yongin-si (KR)

(73) Assignee: MetisX CO., Ltd., Yongin-si (KR)

( * ) Notice: Subject to any disclaimer, the term of this patent is extended or adjusted under 35 U.S.C. 154(b) by 0 days.

(21) Appl. No.: 18/641,999

(22) Filed: Apr. 22, 2024

(30) Foreign Application Priority Data

Jul. 18, 2023 (KR) ........................ 10-2023-0093168

(51) Int. Cl.
*G06F 9/46* (2006.01)
*G06F 9/30* (2018.01)
*G06F 12/0875* (2016.01)

(52) U.S. Cl.
CPC ............ *G06F 9/467* (2013.01); *G06F 9/3016* (2013.01); *G06F 12/0875* (2013.01); *G06F 2212/452* (2013.01)

(58) Field of Classification Search
CPC .... G06F 9/467; G06F 9/3016; G06F 12/0875; G06F 2212/452
See application file for complete search history.

(56) References Cited

U.S. PATENT DOCUMENTS

| | | | |
|---|---|---|---|
| 2012/0117286 A1 | 5/2012 | Yun et al. | |
| 2015/0089153 A1* | 3/2015 | Busaba | G06F 12/0815 |
| | | | 711/141 |
| 2015/0169358 A1* | 6/2015 | Busaba | G06F 9/467 |
| | | | 711/150 |
| 2015/0378927 A1* | 12/2015 | Bradbury | G06F 9/3842 |
| | | | 711/141 |
| 2018/0129259 A1 | 5/2018 | Yoo et al. | |

(Continued)

FOREIGN PATENT DOCUMENTS

| | | |
|---|---|---|
| KR | 10-2012-0046461 A | 5/2012 |
| KR | 10-2018-0051326 A | 5/2018 |
| KR | 10-2018-0086792 A | 8/2018 |

OTHER PUBLICATIONS

"Request for the Submission of an Opinion" Office Action issued in KR 10-2023-0093168; mailed by the Korean Intellectual Property Office on Oct. 10, 2023.

(Continued)

*Primary Examiner* — Kenneth Tang
(74) *Attorney, Agent, or Firm* — Studebaker & Brackett PC

(57) ABSTRACT

A method for processing multiple transactions converted from a single transaction is provided, which is performed by a processor including at least one core and includes converting a first transaction conforming to an instruction according to an instruction set architecture (ISA) into a plurality of second transactions conforming to the register size of the core, and transferring, by the load-store unit (LSU) of the core, the plurality of second transactions to the cache, in which the LSU may be configured to further transfer, to the cache, conversion information indicating whether the plurality of second transactions are converted from the first transaction.

14 Claims, 7 Drawing Sheets

(56) References Cited

U.S. PATENT DOCUMENTS

2019/0377691 A1    12/2019  Kim et al.
2020/0081850 A1*  3/2020  Singh .................. G06F 13/1673
2020/0210175 A1*  7/2020  Alexander ............. G06N 3/045

OTHER PUBLICATIONS

"Written Decision on Registration" Office Action issued in KR 10-2023-0093168; mailed by the Korean Intellectual Property Office on Feb. 26, 2024.

\* cited by examiner

METHOD FOR PROCESSING MULTIPLE TRANSACTIONS CONVERTED FROM SINGLE TRANSACTION IN PROCESSOR, AND PROCESSOR FOR PERFORMING SAME

CROSS-REFERENCE TO RELATED APPLICATION

This application claims priority under 35 U.S.C. § 119 to Korean Patent Application No. 10-2023-0093168, filed in the Korean Intellectual Property Office on Jul. 18, 2023, the entire contents of which are hereby incorporated by reference.

BACKGROUND

Technical Field

The present disclosure relates to a method for processing multiple transactions converted from a single transaction in a processor and a processor for performing the same.

Description of the Related Art

Instruction set architecture (ISA) refers to the structure of the instruction set that allows a processor to recognize, understand, and execute functions. ISA is roughly the same as the programming model of the processor viewed by the assembly language programmer or compiler author. ISA includes instructions, execution models, processor registers, addresses, data formats, etc. ISA can be understood as the lowest-level programming interface, and there are various ways to physically implement ISA. For example, Intel's Pentium and AMD's Athlon can implement the same ISA with different microarchitectures.

ISA generally supports instructions of the same size as registers within the processor. For example, if the register size (i.e., register data width) is 8 bytes, an architecture that supports only 8 bytes of ISA instructions is common. However, ISA may support instructions larger than the register size, and for example, there may also be an architecture configured to support 16 bytes of ISA instructions, although the register size is 8 bytes.

In the latter case (i.e., if the architecture supports ISA instructions larger than the register size), one transaction is converted into multiple transactions to match the register size so as to be processed within the processor. However, since the process of converting these multiple transactions back into one transaction is not guaranteed, the plurality of converted transactions do not go through re-conversion process and are treated as independent individual transactions.

A load-store unit (LSU) of a core is a component configured to transfer data between the core's register and memory. Storing data in the memory may be referred to as a store, and fetching data from the memory and extracting it into the register may be referred to as a load. In more general terms, LSU can be understood as a component of a core configured to allow the core to interface with other components (e.g., cache, memory, or subordinate communicating through a bus).

After one transaction conforming to the ISA instruction is converted into several transactions conforming to the register size, if the LSU transfers these converted transactions to other components, the other components cannot know that the transactions are originated from one transaction in the first place. Therefore, the other components process these transactions as separate and unrelated transactions. For example, if a single load or store transaction is converted into multiple transactions to match the register size, and the LSU transfers these converted transactions to the cache, the cache does not know whether conversion was performed and thus processes the multiple transactions individually. However, it is inefficient to process these transactions individually.

Processor development is progressing toward configuring multiple functions as efficiently and intensively as possible in a limited physical space. Therefore, processing multiple transactions according to the related technology has resulted in a problem of not efficiently utilizing limited resources in processor development.

SUMMARY

In order to solve one or more problems (e.g., the problems described above and/or other problems not explicitly described herein), an object of the present disclosure is to provide a technique for efficiently processing multiple transactions by cache, in a scenario in which a single transaction conforming to an ISA instruction is converted into multiple transactions conforming to a register size of a core.

An object of the present disclosure is to provide a technique for signaling, from an LSU to an internal cache, conversion information when a single transaction is converted into multiple transactions, such that the internal cache can efficiently process the transactions.

An object of the present disclosure is to provide a technique capable of improving computing performance when the core's internal cache transmits and receives data to and from other components outside the core through a bus, by combining multiple transactions into one transaction optimized for the data width of the bus if the data width of the bus is larger than the register size of the core.

The present disclosure may be implemented in various ways including an apparatus, a system, a method, or a computer program stored in a readable storage medium.

An aspect of the present disclosure discloses a method for processing multiple transactions converted from a single transaction. The method may be performed by a processor including at least one core, and may include converting a first transaction conforming to an instruction according to an instruction set architecture (ISA) into a plurality of second transactions conforming to the register size of the core, and transferring, by the load-store unit (LSU) of the core, the plurality of second transactions to the cache, in which the LSU may be configured to further transfer, to the cache, conversion information indicating whether the plurality of second transactions are converted from the first transaction.

The conversion information may be transferred using a user signal or a sideband signal of AXI protocol.

The LSU may be configured to continuously transfer the plurality of second transactions to the cache.

The method may further include, when the conversion information indicates that the plurality of second transactions is converted from the first transaction, combining, by the cache receiving the conversion information, the plurality of second transactions into a third transaction.

The cache may be an internal cache used only by one core, and the combining may be performed by the cache controller of the cache.

A data width of a bus used by the cache may be larger than the register size of the core.

The third transaction may be configured to conform to the data width of the bus used by the cache.

As one aspect of the present disclosure, a processor that performs a method for processing multiple transactions converted from a single transaction is disclosed. The processor includes at least one core, and the method may include converting a first transaction conforming to an instruction according to an instruction set architecture (ISA) into a plurality of second transactions conforming to the register size of the core, and transferring, by the load-store unit (LSU) of the core, the plurality of second transactions to the cache, in which the LSU may be configured to further transfer, to the cache, conversion information indicating whether the plurality of second transactions is converted from the first transaction.

The conversion information may be transferred using a user signal or a sideband signal of AXI protocol.

The LSU may be configured to continuously transfer the plurality of second transactions to the cache.

The method may further include, if the conversion information indicates that the plurality of second transactions are converted from the first transaction, combining, by the cache receiving the conversion information, the plurality of second transactions into a third transaction.

The cache may be an internal cache used only by one core, and the combining may be performed by a cache controller of the cache.

A data width of a bus used by the cache may be larger than the register size of the core.

The third transaction may be configured to conform to the data width of the bus used by the cache.

According to various embodiments of the present disclosure, if a single transaction conforming to the ISA instructions is converted into multiple transactions conforming to the register size of the core, a technique for efficiently processing the converted transactions by the cache can be provided.

According to various embodiments of the present disclosure, if a single transaction is converted into multiple transactions, a technique for signaling conversion information such that the cache may efficiently process the same can be provided.

According to various embodiments of the present disclosure, if the data width of the bus used by the cache in transmitting and receiving data to and from other components is larger than the register size of the core, a technique for the cache that can combine the multiple transactions into transactions optimized for the data width of the bus and thereby improve computing performance can be provided.

The effects of the present disclosure are not limited to the effects described above, and other effects not described herein can be clearly understood by those of ordinary skill in the art (hereinafter referred to as "ordinary technician") from the description of the claims.

BRIEF DESCRIPTION OF THE DRAWINGS

The above and other objects, features and advantages of the present disclosure will become more apparent to those of ordinary skill in the art by describing in detail examples thereof with reference to the accompanying drawings, in which.

DETAILED DESCRIPTION

Figure 1:
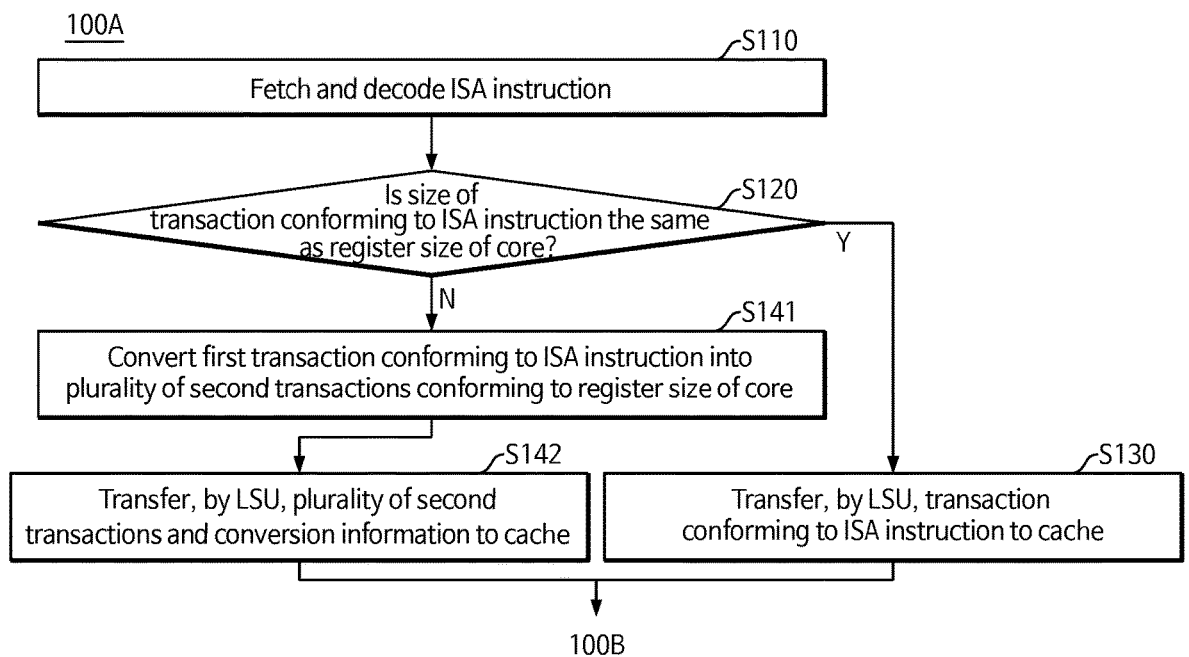
FIG. 1 is a flowchart illustrating a method for processing transactions.

Various embodiments set forth herein are illustrated for the purpose of clearly describing the technical ideas of the present disclosure, and are not intended to be limited to particular embodiments. The technical ideas of the present disclosure include various modifications, equivalents, and alternatives of each embodiment set forth herein, and embodiments obtained by selectively combining all or part of each embodiment. In addition, the scope of the technical ideas of the present disclosure is not limited to various embodiments or specific descriptions thereof presented below.

Terms used herein, including technical or scientific terms, may have the meaning commonly understood by those of ordinary skill in the art to which the present disclosure pertains unless defined otherwise.

As used herein, expressions such as "include(s)," "may include," "is/are provided with", "may be provided with," "have/has," "can have," and the like mean that target features (e.g., functions, operations, components, or the like) exist, and do not preclude the presence of other additional features. That is, such expressions should be understood as open-ended terms that imply the possibility of including other embodiments.

Singular expressions herein include plural expressions unless the context clearly dictates that they are singular. Further, plural expressions include singular expressions unless the context clearly dictates that they are plural. Throughout the specification, when a part is said to include a component, this means that it may further include other components rather than excluding other components unless particularly described to the contrary.

Further, the term 'module' or 'part' used herein refers to a software or hardware component, and the 'module' or 'part' performs certain roles. However, the 'module' or 'part' is not meant to be limited to software or hardware. The 'module' or 'part' may be configured to reside on an addressable storage medium or may be configured to run one or more processors. Therefore, as one example, the 'module' or 'part' may include at least one of components such as software components, object-oriented software components, class components, and task components, processes, functions, properties, procedures, subroutines, segments of program code, drivers, firmware, microcode, circuitry, data, databases, data structures, tables, arrays, or variables. Functions provided within the components and the 'modules' or 'parts' may be combined into a smaller number of components and 'modules' or 'parts,' or may be further separated into additional components and 'modules' or 'parts.'

According to one embodiment of the present disclosure, a 'module' or 'part' may be implemented with a processor and a memory. The 'processor' should be interpreted broadly so as to encompass general-purpose processors, central processing units (CPUs), microprocessors, digital signal processors (DSPs), controllers, microcontrollers, state machines, and the like. In some circumstances, the 'processor' may also refer to an application-specific integrated circuit (ASIC), a programmable logic device (PLD), a field programmable gate array (FPGA), or the like. The 'processor' may also refer to, for example, a combination of processing devices, such as a combination of a DSP and a microprocessor, a combination of a plurality of microprocessors, a combination of one or more microprocessors combined with a DSP core, or a combination of any other such components. In addition, the 'memory' should be interpreted broadly so as to encompass any electronic component capable of storing electronic information. The 'memory' may also refer to various types of processor-readable media, such as random-access memory (RAM), read-only memory (ROM), non-volatile random-access memory (NVRAM), programmable read-only memory (PROM), erasable-programmable read-only memory (EPROM), electrically erasable PROM (EEPROM), flash memory, magnetic or optical data storage, registers, etc. A memory is said to be in electronic communication with a processor if the processor can read information from and/or write information to the memory. A memory integrated with a processor is in electronic communication with the processor.

As used herein, expressions such as "first" and "second" are used to distinguish one object from another when referring to a plurality of objects of the same kind unless the context indicates otherwise, and do not limit the order or importance among the relevant objects.

As used herein, expressions such as "A, B, and C," "A, B, or C," "A, B, and/or C," or "at least one of A, B, and C," "at least one of A, B, or C one," "at least one of A, B, and/or C," "at least one selected from A, B, and C," "at least one selected from A, B, or C," and "at least one selected from A, B, and/or C" may mean all possible combinations of each listed item or listed items. For example, "at least one selected from A and B" may refer to all of (1) A, (2) at least one of A's, (3) B, (4) at least one of B's, (5) at least one of A's and at least one of B's, (6) at least one of A's and B, (7) at least one of B's and A, (8) A and B.

As used herein, the expression "based on" is used to describe one or more factors that affect the action or operation of a decision or determination described in the phrase or sentence including the expression, and this expression does not preclude additional factors that affect the action or operation of that decision or determination.

As used herein, the expression that a component (e.g., a first component) is "connected" or "coupled" to another component (e.g., a second component) may mean that said component is connected or coupled to said another component directly, as well as connected or coupled via yet another component (e.g., a third component).

As used herein, the expression "configured to" may have the meaning of "set to," "having the ability to," "modified to," "made to," "capable of," etc., depending on the context. The expression is not limited to the meaning of "designed specifically in hardware," and for example, a processor configured to perform a particular operation may refer to a generic-purpose processor capable of performing that particular operation by executing software.

Hereinafter, various embodiments of the present disclosure will be described with reference to the accompanying drawings. In the accompanying drawings and description of the drawings, identical or substantially equivalent components may be given the same reference numerals. Further, in the description of various embodiments below, repetitive descriptions of the same or corresponding components may be omitted, which, however, does not mean that such components are not included in that embodiment.

Figure 2:
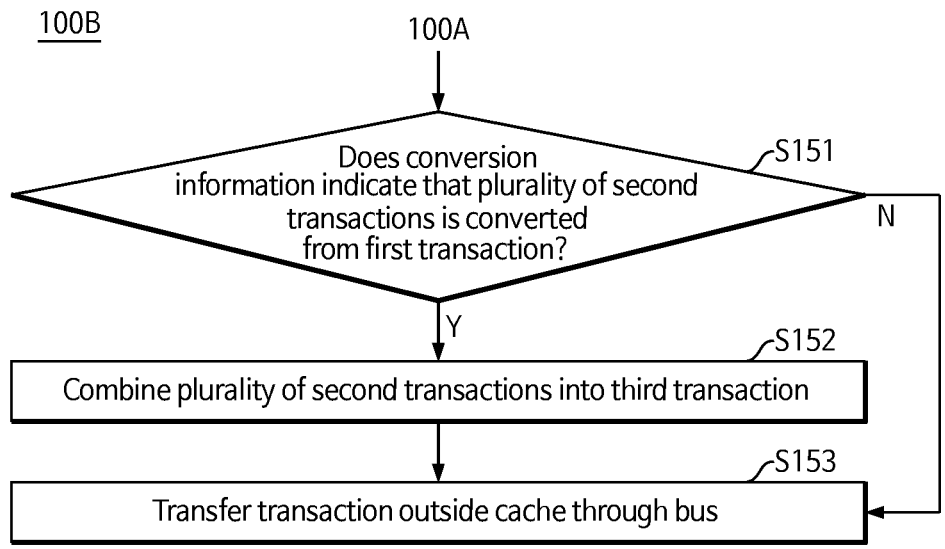
FIG. 2 is a flowchart illustrating a method for processing transactions.
Figure 3:
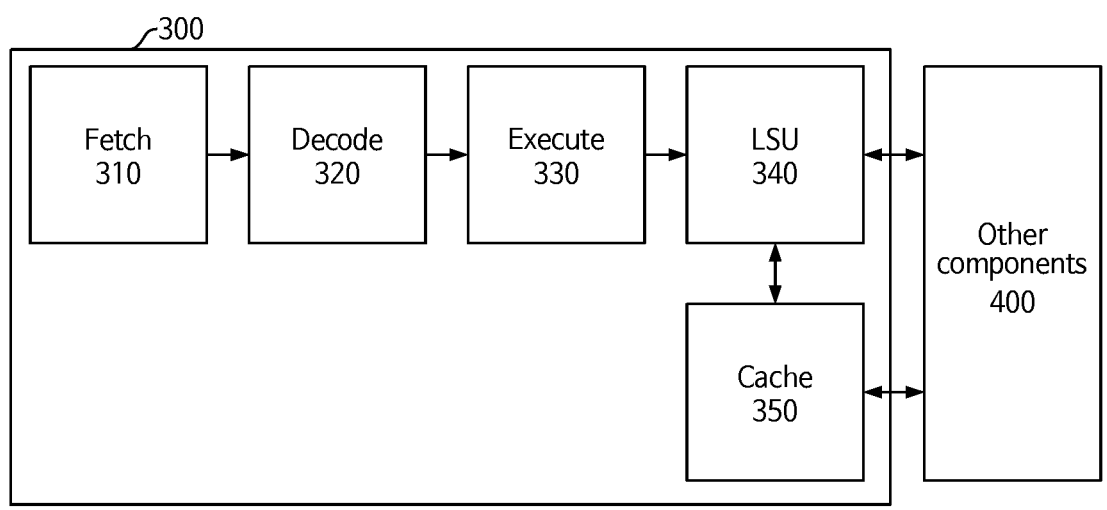
FIG. 3 is a diagram conceptually illustrating a processor for performing a method for processing transactions.

FIGS. 1 and 2 are flowcharts respectively illustrating a method for processing transactions. After performing a method 100A illustrated in FIG. 1, a method 100B illustrated in FIG. 2 may be subsequently performed. FIG. 3 is a diagram conceptually illustrating a processor for performing a method for processing transactions.

First, a process of generally processing an ISA instruction at a processor will be described with reference to FIG. 3. For reference, FIG. 3 may illustrate only some of the components included in a core 300 in the processor to describe some examples of the present disclosure. Therefore, it goes without saying that another components may also be included in the core 300 in addition to the components explicitly illustrated in FIG. 3.

In order for the processor to execute an instruction, it generally goes through a process called an instruction cycle. The instruction cycle is also referred to as the fetch-decode-execute cycle. In the fetch stage, a fetch circuit 310 fetches an ISA instruction to be executed by the core 300. For example, the fetch circuit 310 may read the instruction using a program counter PC as an input. In the decode stage, a decoding circuit 320 may interpret the instruction to determine which operation is to be performed, and generate control signals necessary for performing the operation. These control signals may be used to control so that the instruction is executed correctly at a subsequent stage of the pipeline. In the execute stage, an execute circuit 330 may actually perform the operation according to the instruction. If the instruction requires an operand, the instruction may also be read from the register. In the execute stage, an arithmetical logic unit (ALU) or other execution unit may be operated to process appropriate operations according to the instruction.

If the instruction is executed through the instruction cycle described above, result data calculated after completion of the operation may be stored in the register. The result value stored in the register is first stored in the register, but may eventually be transferred to a destination outside the core 300. For example, the destination outside the core 300 may be other components 400 illustrated in FIG. 3 (e.g., external cache, memory, subordinate, etc.).

As illustrated in FIG. 3, the core 300 may include a load-store unit (LSU) 340 to interface with the other components 400 outside the core 300. The LSU 340 may be used for transferring the data value stored in the register to a destination outside the core 300.

The LSU 340 may also be referred to as a load-store engine or a load engine. The term "LSU" 340 as used herein may be understood as a generic term for a concept that may be interfaced through a bus with the other components 400 (e.g., external cache, memory, subordinate, etc.) outside the core 300.

Meanwhile, as illustrated in FIG. 3, the core 300 may further include an internal cache 350. The internal cache 350 is slower than the register, but may provide a larger storage space. In addition, the internal cache 350 may be a storage that is faster and provides less storage space than the external cache.

In performing an operation of loading data of a predetermined address into the register or storing data into a memory at a predetermined address, the LSU 340 may first check if the corresponding data can be obtained from the internal cache 350 before interfacing with an external cache or memory. When data of a corresponding address is hit in the internal cache 350, the data may be stored or read from the corresponding location of the internal cache 350 without interfacing with the external cache or memory.

The internal cache 350 may be an L0 cache, but is not limited thereto. Depending on methods of implementation, if one L1 cache is assigned to each core 300 in a processor including a plurality of cores, then the L1 cache may be used as the internal cache 350 to be described below. For example, if the internal cache 350 used by each core 300 is an L0 cache, and the cache shared by a plurality of cores 300 is an L1 cache, the internal cache 350 according to some examples may be the L0 cache. Alternatively, if the internal cache 350 individually used by each core 300 is an L1 cache, and the cache shared by a plurality of cores 300 is an L2 cache, the internal cache 350 according to some examples may be the L1 cache. Meanwhile, in order to more concisely and clearly explain the examples of the present disclosure, a scenario in which the internal cache 350 is an L0 cache will be mainly described, but the scope of protection of the present disclosure is not limited to such a scenario.

Hereinafter, a method for processing transactions according to some examples of the present disclosure will be described with reference to FIGS. 1 to 3.

As illustrated in FIG. 1, the method 100A for processing transactions may include fetching and decoding an ISA instruction (S110). At S110, the fetch process may correspond to the fetch stage described above, and the decode process may be part of the decode stage described above.

Following the fetching and decoding at S110, it may be determined (S120) whether the size of the transaction conforming to the ISA instruction is the same as the register size of the core 300. The determining at S120 may be performed in the decode stage by the decoding circuit 320. ISA generally supports instructions of the same size as the register in the processor, but it may also support instructions larger than the register size. For example, it may have a register size of 4 bytes (i.e., 32 bits), and support 8 bytes (i.e., 64 bits) of instruction. Alternatively, it may have a register size of 8 bytes (i.e., 64 bits), and support 16 bytes (i.e., 128 bits) of instruction. This provides scalability for efficient use of processors, and also is a means for users and developers to support a wide range of software development tools. Hereinafter, examples of the present disclosure will be described based on the assumption that the ISA has a register size of 8 bytes and supports an 16 bytes of instruction. However, these figures are merely examples to facilitate explanation of the examples in the present disclosure, and the scope of protection of the present disclosure is not limited to these figures.

If the size of the transaction conforming to the ISA instruction is the same as the register size of the core 300, the LSU 340 may transfer (S130) the transaction to the cache 350 without specifically converting the same. For example, if the register size is 8 bytes and the transaction size conforming to the ISA instruction is also 8 bytes, the LSU 340 may transfer the execution result of the ISA instruction executed through the instruction cycle to the cache 350. In the example described in FIG. 1, no intermediate steps are illustrated between the determining (S120) and the transferring (S130), but additional stages such as the execute stage may also be included between the determining (S120) and the transferring (S130).

If, as a result of the determination at the determining (S120), the size of the transaction conforming to the ISA instruction is different from the register size of the core 300 (e.g., if the former is larger than the latter), the transaction may be converted into multiple transactions conforming to the register size of the core. That is, the first transaction conforming to the ISA instruction may be converted (S141) into a plurality of second transactions conforming to the register size of the core 300.

Figure 4:
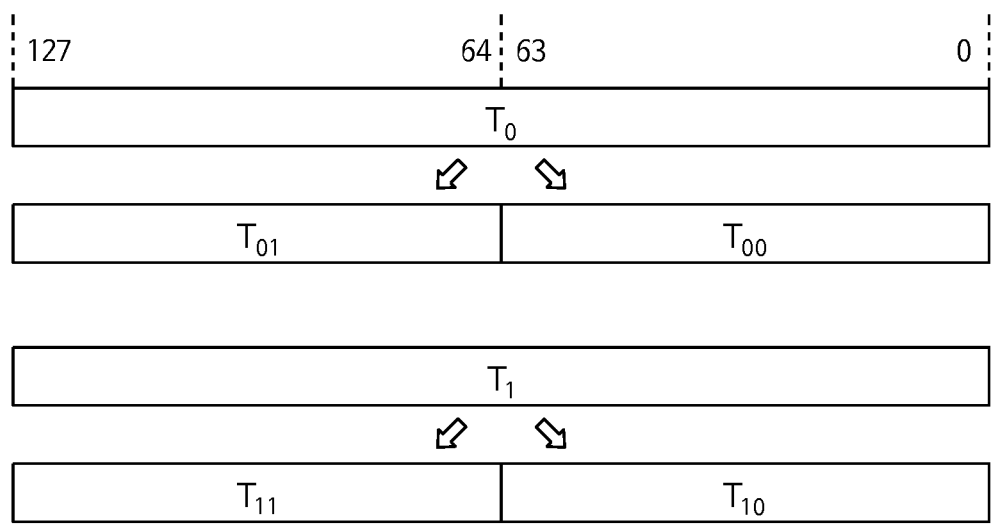
FIG. 4 is a diagram conceptually illustrating a process of converting a first transaction into a plurality of second transactions with a method for processing transactions.

FIG. 4 is a diagram conceptually illustrating a process of converting a first transaction into a plurality of second transactions with a method for processing transactions. As illustrated in FIG. 4, transactions T0 and T1 have a size of 16 bytes (i.e., 128 bits). If the register size of the core 300 is 8 bytes (i.e., 64 bits), the transactions T0 and T1 may be converted into 8 bytes sizes to be performed in the core 300. For example, T0 with a size of 16 bytes may be converted into T00 and T01 with a size of 8 bytes, and T1 with a size of 16 bytes may be converted into T10 and T11 with a size of 8 bytes. The example illustrated in FIG. 4 may be understood as a schematic diagram of a process of performing the converting (S141) illustrated in FIG. 1.

Following the converting (S141), the LSU 340 may perform transferring (S142) the plurality of second transactions to the cache 350 together with predetermined conversion information. Meanwhile, rather than transferring the plurality of second transactions discontinuously, the LSU 340 may continuously transfer the plurality of second transactions to the cache 350.

The converting (S141) may be performed by the decoding circuit 320. Although not explicitly illustrated in FIG. 1, an execute stage performed by the execute circuit 330 may be further included, which is a stage after the converting (S141) is performed by the decoding circuit 320 and before the transferring (S142) is performed by the LSU 340.

Meanwhile, the component that performs the converting (S141) is not limited to the decoding circuit 320. Depending on methods of implementation, both the converting (S141) and the transferring (S142) may be performed by the LSU 340.

The conversion information is information indicating whether the plurality of second transactions are converted from the first transaction. The LSU 340 may transfer this conversion information to the cache 350 to provide a clue for the cache 350 to recombine the second transactions. For example, the conversion information may be transferred using a user signal or a sideband signal of the AXI protocol. That is, the conversion information may be transferred using a user signal or a sideband signal used in an Advanced Microcontroller Bus Architecture Extensible Interface (AMBA AXI) bus.

According to some examples, the LSU 340 may transfer such conversion information (i.e., information indicating that one transaction conforming to the ISA instruction was converted into several transactions conforming to the register size) to another component (e.g., to the cache 350). By doing so, there is an advantage that other components such as the cache 350 is able to process these transactions as related transactions rather than as separate and irrelevant transactions. For example, if a single load or store transaction is converted into several transactions in accordance with the register size, and the LSU 340 transfers these converted transactions to the cache 350, the cache 350 does not process each transaction individually because it can know through the conversion information that the transactions are converted. That is, there is an advantage in that multiple transactions can be recombined into one transaction and processed efficiently.

A method of utilizing the conversion information will be described in more detail with reference to FIG. 2. If the cache 350 receives and confirms (S151) the conversion information, the cache 350 may determine by itself whether the plurality of second transactions are converted from the first transaction. For example, if the conversion information is represented using AXI user bits, and if the bit is 1 (note that this is only an example and the fact that there has been conversion may be represented as 0 depending on the methods of implementation), this may be interpreted as meaning that multiple transactions converted from one transaction are scheduled to be transferred and that these transactions should be recombined into one transaction.

As a result of performing the confirming (S151) the conversion information, if the conversion information indicates that the plurality of second transactions are converted from the first transaction, the cache 350 receiving the conversion information may combine (S152) the plurality of second transactions into a third transaction. In addition, the cache 350 may transfer the combined transaction (i.e., the third transaction) to the outside through a bus, at S153. The cache 350 may be an internal cache used only by one core, and the combining (S152) may be performed by a cache controller of the cache 350.

Meanwhile, as a result of performing the confirming (S151) the conversion information, if the conversion information indicates that the plurality of second transactions are not converted from the first transaction (or if no conversion information is transferred to the cache 350), the cache 350 does not need to perform the combining (S152) the received transactions (that is, the transaction is a transaction transferred in S130 and is not a converted (divided) one). That is, the cache 350 may transfer (S153) the transaction to the outside through a bus without separate processing for the transaction.

Hereinafter, referring to FIGS. 4 to 7, the concept of transferring transactions to the outside through a bus without recombining transactions is first presented, and the concept of recombining transactions in the cache 350 and transferring the result to the outside through a bus is then presented. In addition, the difference in efficiency between when there is no recombining in the internal cache 350 and when there is recombining will be described as an example.

As illustrated in FIG. 4, first transactions (e.g., T0 and T1) conforming to the instruction according to the ISA may be converted into second transactions (e.g., T00, T01, T10 and T11) conforming to the register size of the core 300. This is substantially the same as the process described above with reference to S120, S141, and the like with reference to FIG. 1.

Figure 5:
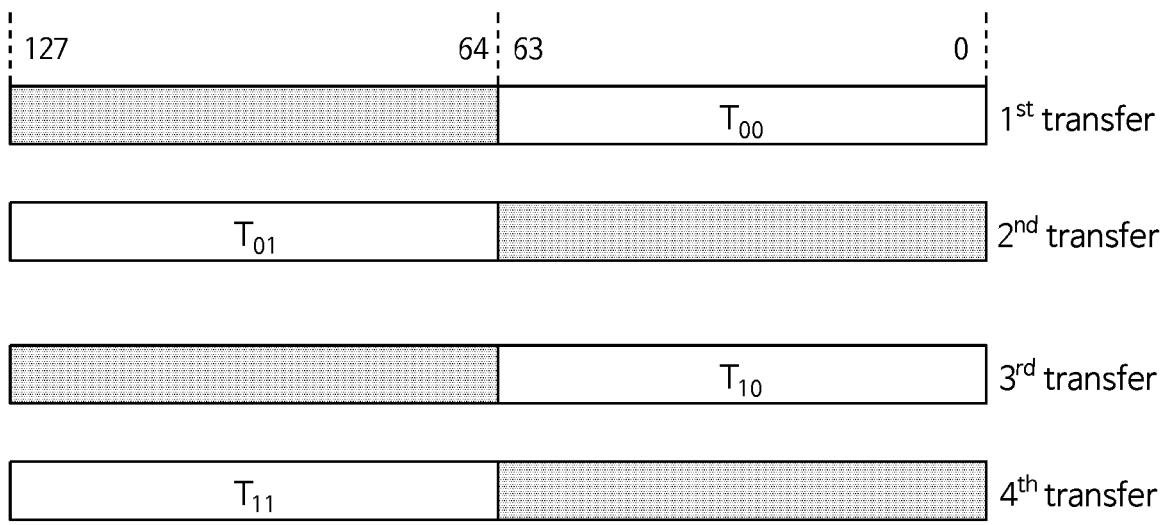
FIG. 5 is a diagram conceptually illustrating a process of transmitting a plurality of second transactions through a bus without recombining them, with a related method for processing transactions.

If the LSU 340 transfers the second transaction to the cache 350, but does not provide the cache 350 with the conversion information, the cache 350 cannot recombine these second transactions because it cannot know that the transactions are originated from a single transaction. That is, the cache 350 processes the second transactions as separate transactions. In other words, if the cache 350 does not recombine the second transactions (e.g., T00, T01, T10 and T11) and has to process them as separate transactions, when the cache 350 transfers the second transactions to the external other component 400 through a bus, it should go through a total of four transmitting processes, that is, as many as the number of second transactions (e.g., T00, T01, T10 and T11), as illustrated in FIG. 5.

However, if the data width of the bus used by the cache 350 (e.g., the bus present between the cache 350 and the other component 400 in the example of FIG. 3) is larger than the register size of the core 300, the four transmitting processes described above are very inefficient. For example, if the data width of the bus used by the cache 350 is 16 bytes (i.e., 128 bits) and the register size is 8 bytes (i.e., 64 bits), the bus will be used more efficiently by performing the recombining process according to the examples of the present disclosure.

Figure 6:
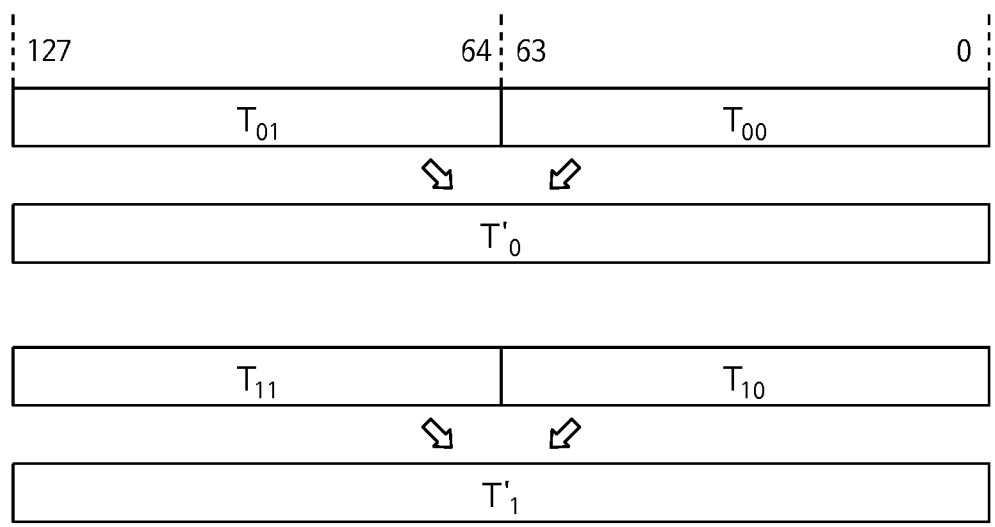
FIG. 6 is a diagram conceptually illustrating a process of combining a plurality of second transactions into a third transaction with a method for processing transactions.

For example, FIG. 6 is a diagram conceptually illustrating a process of combining a plurality of second transactions into a third transaction, with a method for processing transactions according to some examples of the present disclosure. By performing the combining (S152) of FIG. 2, as illustrated in FIG. 6, the second transactions (e.g., T00, T01, T10 and T11) may be combined to configure third transactions (e.g., T'0 and T'1) to match the data width of the bus. The third transactions may be configured to conform to the data width of the bus used by the cache 350.

Figure 7:
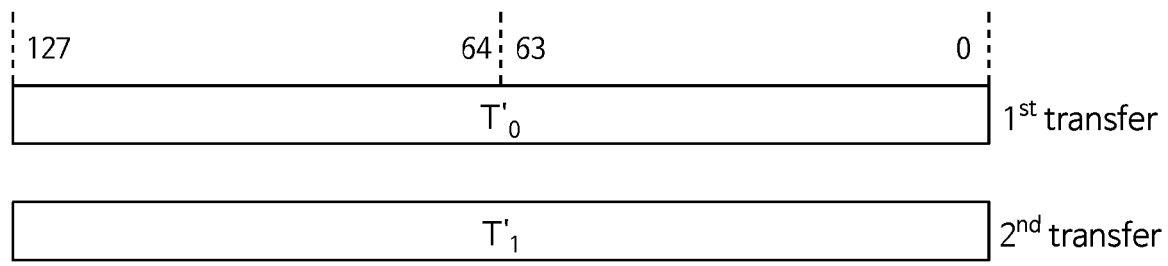
FIG. 7 is a diagram conceptually illustrating a process of transferring a third transaction through a bus with a method for processing transactions.

As illustrated in FIG. 7, if 8-byte second transactions (e.g., T00, T01, T10 and T11) are combined into 16-byte third transactions (e.g., T'0 and T'1), and the combined third transactions are transmitted through the bus, the number of transmitting processes may be reduced to two in total.

As a result, compared to the four times of transmitting processes illustrated in FIG. 5, the two times of transmitting processes illustrated in FIG. 7 are considerably more efficient. This is not simply because the number of transmissions was halved. The advantages include not only the number of transmitting processes reduced by a total of two times, but also the availability of using the bus for other purposes during that time. That is, because the bus resources can be provided to other components to use the bus, the influence on the efficiency of the system as a whole can be further increased.

The methods for processing multiple transactions converted from a single transaction according to some examples of the present disclosure have been described with reference to FIGS. 1 to 7. These methods may be performed by a processor including at least one core. As previously described, the "processor" may refer to a combination of processing devices such as general-purpose processors, central processing units (CPUs), microprocessors, digital signal processors (DSPs), controllers, microcontrollers, state machines, on-demand semiconductors (ASICs), programmable logic devices (PLDs), field programmable gate arrays (FPGA), a combination of DSPs and microprocessors, a combination of a plurality of microprocessors, a combination of one or more microprocessors combined with DSP cores, or any other combination of such configurations. In addition, the processor may be a general-purpose processor that can execute software to perform that specific operation. In addition, the processor may include all or at least some of the components described with reference to FIG. 3.

The methods in accordance with the present disclosure may be computer-implemented methods. Although each step of the corresponding methods has been shown and described in a given order in the present disclosure, the respective steps may also be performed in an order that can be combined arbitrarily according to the present disclosure, in addition to being performed in sequence. In one embodiment, at least some of the steps may be performed in parallel, iteratively, or heuristically. The present disclosure does not exclude making changes or modifications to the methods. In one embodiment, at least some of the steps may be omitted or other steps may be added.

Various embodiments of the present disclosure may be implemented as software recorded on a machine-readable recording medium. The software may be software for implementing the various embodiments of the present disclosure described above. Software may be inferred from the various embodiments of the present disclosure by programmers skilled in the art to which the present disclosure pertains. For example, the software may be machine-readable commands (e.g., code or code segments) or programs. A machine is a device capable of operating according to instructions called from a recording medium, and may be, for example, a computer. In one embodiment, the machine may be the multiprocessor system 100, a component thereof, or a combination of components thereof in accordance with the embodiments of the present disclosure. In one embodiment, the processor of the machine may execute the called command and cause the components of the machine to perform functions corresponding to the command. The recording medium may refer to any type of recording medium on which data readable by a machine are stored. The recording medium may include, for example, ROM, RAM, CD-ROM, magnetic tapes, floppy disks, optical data storage devices, and the like. In one embodiment, the recording medium may be implemented in a distributed form over networked computer systems or the like. The software may be stored in a distributed manner and executed on a computer system or the like. The recording medium may be a non-transitory recording medium. A non-transitory recording medium refers to a tangible medium regardless of whether data is stored in it semi-permanently or temporarily, and does not include signals propagating in a transitory manner.

Although the technical idea of the present disclosure has been described by various embodiments above, the technical idea of the present disclosure includes various substitutions, modifications, and changes that can be made within the scope that can be understood by those skilled in the art to which the present disclosure pertains. Further, it is to be understood that such substitutions, modifications, and changes may fall within the scope of the appended claims. The embodiments in accordance with the present disclosure may be combined with each other. The respective embodiments may be combined in various ways according to the number of cases, and the combined embodiments also fall within the scope of the present disclosure.

The invention claimed is:

1. A method for processing multiple transactions converted from a single transaction, the method being performed by a processor including at least one core and comprising:
   determining, by a decoding circuit of the core, whether a size of a first transaction conforming to an instruction according to an instruction set architecture (ISA) is the same as a register size of the core;
   in response to determining that the size of the first transaction is larger than the register size of the core, converting, by the decoding circuit or a load-store unit (LSU) of the core, the first transaction into a plurality of second transactions conforming to the register size of the core; and
   transferring, by the LSU, the plurality of second transactions to a cache of the core,
   wherein the LSU is configured to further transfer, to the cache, conversion information indicating whether the plurality of second transactions are converted from the first transaction.

2. The method according to claim 1, wherein the conversion information is transferred using a user signal or a sideband signal of AXI protocol.

3. The method according to claim 1, wherein the LSU is configured to continuously transfer the plurality of second transactions to the cache.

4. The method according to claim 1, further comprising, when the conversion information indicates that the plurality of second transactions is converted from the first transaction, combining, by the cache receiving the conversion information, the plurality of second transactions into a third transaction.

5. The method according to claim 4, wherein the cache is an internal cache used only by one core, and
   wherein the combining is performed by a cache controller of the cache.

6. The method according to claim 5, wherein a data width of a bus used by the cache is larger than the register size of the core.

7. The method according to claim 6, wherein the third transaction is configured to conform to the data width of the bus used by the cache.

8. A processor that performs a method for processing multiple transactions converted from a single transaction,
   wherein the processor includes at least one core,
   wherein the method includes:
   determining, by a decoding circuit of the core, whether a size of a first transaction conforming to an instruction according to an instruction set architecture (ISA) is the same as a register size of the core;
   in response to determining that the size of the first transaction is larger than the register size of the core, converting, by the decoding circuit or a load-store unit (LSU) of the core, the first transaction into a plurality of second transactions conforming to the register size of the core; and
   transferring, by the LSU, the plurality of second transactions to the cache of the core, and
   wherein the LSU is configured to further transfer, to the cache, conversion information indicating whether the plurality of second transactions is converted from the first transaction.

9. The processor according to claim 8, wherein the conversion information is transferred using a user signal or a sideband signal of AXI protocol.

10. The processor according to claim 8, wherein the LSU is configured to continuously transfer the plurality of second transactions to the cache.

11. The processor according to claim 8, wherein the method further includes, when the conversion information indicates that the plurality of second transactions is converted from the first transaction, combining, by the cache receiving the conversion information, the plurality of second transactions into a third transaction.

12. The processor according to claim 11, wherein the cache is an internal cache used only by one core, and
    wherein the combining is performed by a cache controller of the cache.

13. The processor according to claim 12, wherein a data width of a bus used by the cache is larger than the register size of the core.

14. The processor according to claim 13, wherein the third transaction is configured to conform to the data width of the bus used by the cache.

* * * * *